United States Patent
Qian et al.

(10) Patent No.: US 11,660,858 B2
(45) Date of Patent: May 30, 2023

(54) METHOD AND APPARATUS FOR PRINTHEAD MAINTENANCE

(71) Applicant: Hewlett-Packard Development Company, L.P., Spring, TX (US)

(72) Inventors: Li Qian, Sant Cugat del Valles (ES); Secundino Vicente Vicente, Sant Cugat del Valles (ES); Marc Bautista Palacios, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 221 days.

(21) Appl. No.: 17/050,908

(22) PCT Filed: Jun. 21, 2018

(86) PCT No.: PCT/US2018/038784
§ 371 (c)(1),
(2) Date: Oct. 27, 2020

(87) PCT Pub. No.: WO2019/245566
PCT Pub. Date: Dec. 26, 2019

(65) Prior Publication Data
US 2021/0229424 A1 Jul. 29, 2021

(51) Int. Cl.
*B41J 2/045* (2006.01)
(52) U.S. Cl.
CPC ....... *B41J 2/04508* (2013.01); *B41J 2/04586* (2013.01)

(58) Field of Classification Search
CPC .......................... B41J 2/04508; B41J 2/04586
See application file for complete search history.

(56) References Cited

U.S. PATENT DOCUMENTS

| | | | |
|---|---|---|---|
| 6,402,287 B2 | 6/2002 | Matsumoto et al. | |
| 2008/0111846 A1* | 5/2008 | Walmsley | B41J 2/205 347/15 |
| 2009/0073219 A1 | 3/2009 | Curcio et al. | |
| 2015/0049137 A1 | 2/2015 | Lint | |
| 2017/0348978 A1 | 12/2017 | Van Garsse | |
| 2018/0126750 A1 | 5/2018 | Lau | |

FOREIGN PATENT DOCUMENTS

| | | |
|---|---|---|
| EP | 0854039 | 9/2003 |
| JP | 2010036382 | 2/2010 |

\* cited by examiner

*Primary Examiner* — Thinh H Nguyen

(57) ABSTRACT

In an example, there is provided a method and apparatus for controlling spit on page operation, the method comprising receiving at least one image to be printed, for each row of a plurality of rows of the image: identifying two or more pixels of the row of the image to be printed by a nozzle of a printhead, determining if a spacing between two consecutive pixels of the two or more pixels is greater than a threshold distance, and in response to a determination that the spacing between the two consecutive pixels is greater than the threshold distance, providing an indication that spit on page dots should be provided when printing the image.

18 Claims, 6 Drawing Sheets

METHOD AND APPARATUS FOR PRINTHEAD MAINTENANCE

BACKGROUND

Many printers operate by ejecting printing liquid, such as an ink, from a printhead in the printer onto a printing medium in determined locations in order to print an image on the printing medium. The printing liquid used may be water or solvent based and may be stored in reservoirs or cartridges in the printer until used for printing an image. During printing, the printing liquid may be ejected through a plurality of nozzles on the printhead as the printhead passes over a printing medium. The printhead may include different nozzles for different coloured printing liquids. The printhead may move across the printing medium during the printing operation in order to deposit printing liquid onto the printing medium at the correct location for forming the image. For example; a printhead may move from one side of a track to another side of the track as the printing medium is passed beneath the printhead. The nozzles of the printhead may be capped when not in used in order to prevent evaporation of the printing liquid through the nozzles.

BRIEF INTRODUCTION OF THE DRAWINGS

Various features of the present disclosure will be apparent from the detailed description which follows; taken in conjunction with the accompanying drawings; which together illustrate features of the present disclosure, and wherein.

DETAILED DESCRIPTION

Figure 1:
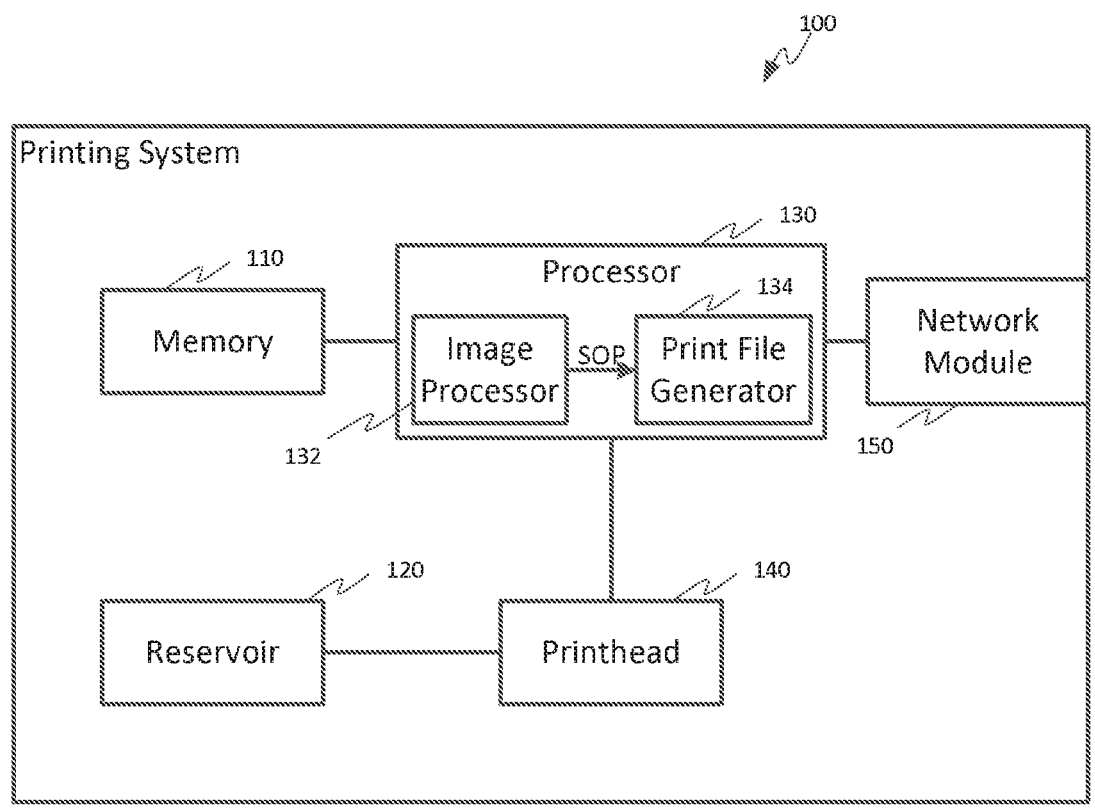
FIG. 1 shows a printing system according to an example of the disclosure.

In the following description, for purposes of explanation; numerous specific details of certain examples are set forth. Reference in the specification to "an example" or similar language means that a particular feature, structure, or characteristic described in connection with the example is included in at least that one example, but not necessarily in other examples.

Commercially available printers may include a printhead for ejecting printing liquid, such as an ink, through a nozzle, or a plurality of nozzles, during a printing image in order to form an image. In the case when solvent or water-based printing liquid is used, a reduction in print quality may arise due to evaporation from the nozzles between printing liquid ejection, or firing, of the nozzles, which may reduce print quality as printing liquid dries out and partially or fully clogs the nozzle. This may obstruct the passage of printing fluid as it is ejected through the nozzle. To mitigate this, nozzles may be "capped" between use to prevent evaporation through the nozzles. For example, a nozzle cap may be attached to the nozzle to cover the opening of the nozzle and form a seal to prevent exposure to external environments. As used herein, "decap" refers to a situation when a nozzle is not capped, and thus a situation where evaporation may negatively affect printing quality and nozzle health. The printing liquid drying out on the nozzle may affect printing quality as when the nozzle is desired to be used for printing an image, passage of the printing liquid through the nozzle may be obstructed by ink residue, and consequently the printing liquid may not be deposited at the correct location on the printing medium. The size of the drop of printing liquid may also be different to the desired drop size due to the level of clogging of the nozzle.

As used herein, "decap time" of a nozzle is the shorter time of i) the amount of time since a nozzle was most recently decapped or serviced; and ii) the amount of time since a nozzle most recently ejected printing liquid. It is to be understood that in some examples, servicing of the nozzle may include ejecting printing liquid through the nozzle.

A printhead may include a plurality of nozzles which may be fired independently from one another. Therefore, each nozzle may have a different decap time. For example, a nozzle corresponding to a colour or print location that is infrequently used may spend more time in a state where the nozzle is neither capped nor fired as the printhead traverses across the printing medium, which may lead to a greater impact on nozzle health and printing quality for that particular nozzle.

The effects of decap on nozzle health and print quality may be mitigated by servicing the nozzle in a servicing area or ejecting printing liquid through the nozzle. When printing liquid is ejected through the nozzle, the passage of the ejected printing liquid may remove printing liquid residue from the nozzle. The process of ejecting printing liquid through a nozzle for the purpose of cleaning the nozzle (as opposed to a desired printing operation) may be known as "spitting".

Nozzle maintenance may be performed by spitting directly onto the printing medium. For example, as the printhead traverses a printing medium, in what is known as a swath, the printhead nozzles may fire at times and locations other than those designated for forming the printed image and eject printing liquid onto the printing medium in order to clean the printhead nozzles. This technique may be known as "spit on page". Performing spit on page may mitigate rapid deterioration of nozzle health and printing quality associated with decap. For example, in the case where a nozzle is not used frequently for printing the image, spitting on the page with said nozzle may refresh the nozzle, which may increase print quality.

However, in some circumstances the dots formed on the print medium through the use of spit on page may be visible in the final printed output, depending on the texture and colour of the spat dots. In particular, certain printing technologies may be particularly susceptible to visible dots associated with spit on page. For example, in dye sublimation printing, due to the dot gain after sublimation, spat dots may be more visible than with other printing techniques.

Certain examples described herein provide methods and systems for generating printed images while reducing artefacts in the desired print output caused by spit on page operation. For example, methods may be provided to analyse images to be printed and identify when spit on page operation may be disabled without impacting print quality.

FIG. 1 shows a printing system 100 according to an example of the disclosure. The printing system 100 may include a memory 110, reservoir 120, processor 130, print job processing engine 132, printhead 140 and a network module 150. The skilled person will appreciate that a printing system 100 may comprise a number of other known components of which a description here is omitted, and that some components of the printing system 100 shown in FIG. 1 may be optional for the purposes of this disclosure.

The memory 110 may be configured to store instructions for the operation of the printing system. For example, the memory 110 may store instructions useable by the processor 130 to control the printing system 100 to print an image onto a printing medium.

Printhead 140 may include at least one nozzle for ejecting a printing liquid, such as an ink, an overcoat, a colour enhancer or the like, onto a printing medium to form an image. The printhead 140 may perform a spit on page operation to clean the at least one nozzle of the printhead 140.

The printing system may operate on a printing medium. The printing medium may be a substrate onto which the printing system 100 prints an image using the printhead 140. For example, the printing medium may be printing paper, cardboard, textiles, etc. The printing medium may be physically moved by the printing system 100. For example, the printing medium may be a plurality of pages of printing paper which are kept in a storage part of the printing system 100 and passed one at a time through a space under the printhead 140 during printing. For example, the printing medium may be moved in a direction perpendicular to the direction of movement of the printhead 140 during printing. Alternatively, the printing medium may be static during printing, and the printhead 140 may perform all desired movement to print an image.

The printhead 140 may print an image onto the printing medium according to instructions received from the processor 130. That is, the printhead 140 may operate under the control of the processor 130. The printhead 140 may be connected to reservoirs 120 or cartridges for storing printing liquid until use of the printing liquid is desired. The printhead 140 may eject a plurality of printing liquids of different colours and may include different nozzles for ejecting different coloured printing liquids. The printhead 140 may also include different nozzles for ejecting printing liquid onto different areas of the printing medium. The printhead 140 may include means of capping the nozzles to prevent evaporation of the printing liquid, for example the printhead may include mechanical caps to cover an opening of a nozzle to prevent exposure to the external environment.

The printhead 140 may print onto the printing medium using printing liquid, which may be stored in a reservoir 120 until the printing liquid is to be used for printing of an image or for spitting. The reservoir 120 may contain a single printing liquid or several different printing liquids. The reservoir 120 may be sealed to protect the printing liquid from an external environment.

The printing system 100 may operate under the control of the processor 130. The processor 130 may control the printhead 140 to print an image on the printing medium by ejecting printing liquid through the nozzles of the printhead 140 as the printhead traverses across the printing medium.

The processor 130 may include an image processor 132 and a print output module 134. The image processor 132 may receive information relating to a print job from the network module 150, including at least one image to be printed, and provide an indication to a print output module 134 to indicate whether spit on page should be applied for the print job. In particular, the image processor 132 may analyse the received print job and determine whether to apply spit on page based on properties of the images to be printed as discussed below.

Print output module 134 receives the indication from the image processor 132 and based on the indication generates spit on page dots for the print job, and controls the printhead 140 to spit printing liquid onto the print medium as required. For example, if an indication that spit on page should be applied is received from the image processor 132, the print output module 134 may merge a layer comprising spit on page dots with a layer comprising the one or more images to be printed to generate a print output file to be printed to the print medium by the printhead 140.

The printing system 100 of FIG. 1 may be, for example, an inkjet printing system, a dye sublimation printing system or a piezoelectric printing system. The skilled person would understand that the example printing system 100 and the following methods disclosed herein should not be limited to a particular type of printing system, but may be applied to any printing system which uses printing liquid susceptible to evaporation and nozzles which may be maintained by ejecting printing liquid.

Figure 2:
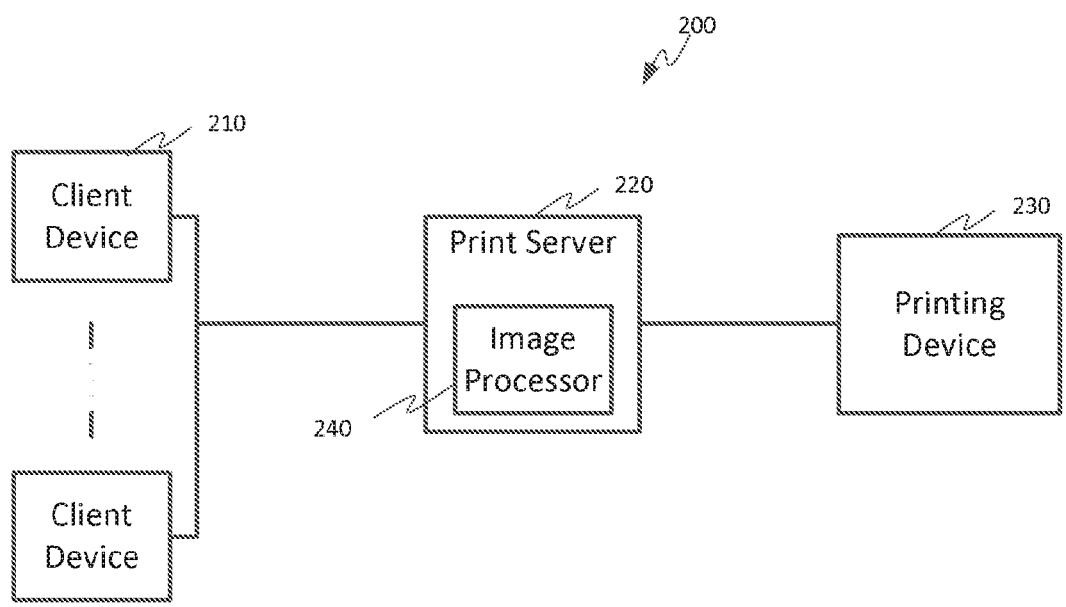
FIG. 2 shows a networked printing system according to an example of the disclosure.

FIG. 2 illustrates a different arrangement 200 in which an image processor 240 is located in a print server 220, which may be located in a cloud. One or more client devices 210 may communicate print jobs to the print server 220. The print server 220 may then dispatch the print job to a printing device 230 over a network connection.

According to some examples, the image processor 240 may process the print job at the print server 220 to determine whether spit on page should be applied when printing the print job and provide an indication to the printing device 230 along with the print job.

According to some examples, the described image processing functionality may be performed on an external user station coupled to a printing system and the output file including an indication of where spit on page operation should be enabled transmitted to the printing system to be rendered to a print medium. In such arrangements, a driver software may be loaded on to the user system and may comprise information relating to decap times for one or more nozzles of the printhead 140.

Figure 3A:
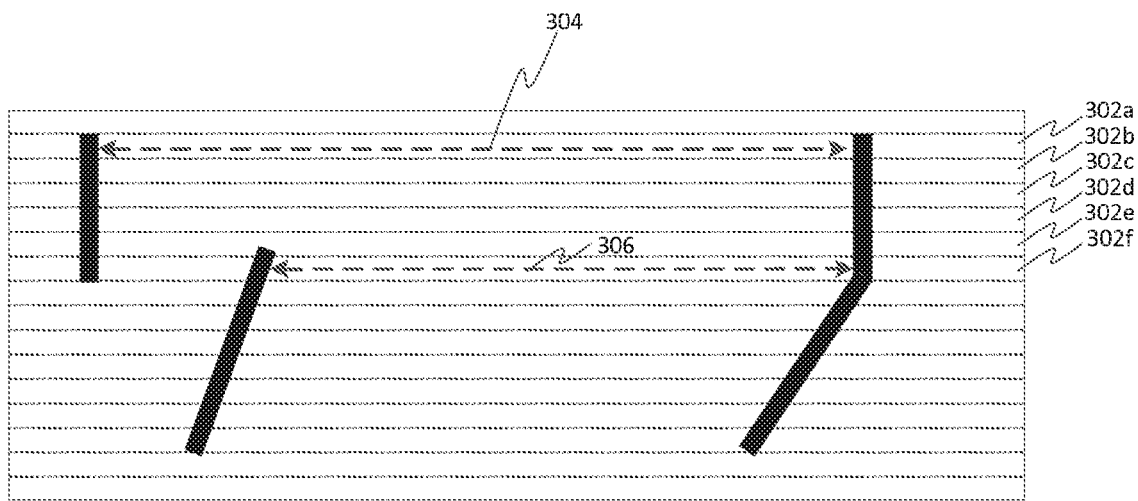
FIGS. 3a and 3b show image processing examples according to examples of the disclosure.
Figure 3B:
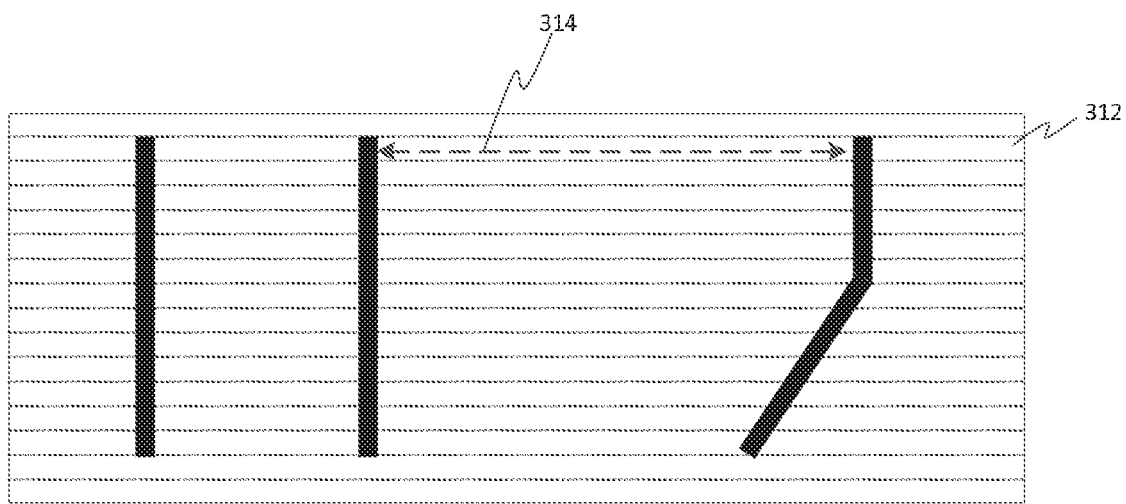

FIGS. 3a and 3b shows an example print output that illustrate examples of operation of the image processor 132 of system 100. FIG. 3a illustrates a plurality of rows 302 of an image to be printed. Individual pixels to be printed in each row are shown as black squares. Upon receiving the print job information of FIG. 3a, the image processor analyses each row of the print job to identify spaces 304, 306 between pixels in a row, between which a nozzle is not activated. The image processor 132 uses this information to determine whether a nozzle of the printhead 140 would be expected to exceed its decap time when printing the image. If the image processor 132 identifies a row having a large spacing 304 between two consecutive pixels that exceeds a threshold spacing corresponding to a decap time of the nozzle, it may be determined that spit on page operation should be enabled to avoid possible reduction in print quality due to the effects of decap.

For many images, a nozzle may be activated regularly while printing the image to a print medium. FIG. 3b illustrates an example having more frequent activation of the nozzle. Thus, when analysing the print job of FIG. 3b, the image processor 132 may determine that the spacing between consecutive pixels 314 of row 312 is less than the threshold distance. In response to this determination, the image processor 132 will provide an indication that spit on page operation should be disabled when printing the print job.

In some examples, the image processor 132 may analyse each row of a print job to determine whether the decap time of a nozzle will be exceeded by identifying if the threshold distance is exceeded for any two consecutive pixels on any row of the print file. If it is determined that the decap time of the nozzle will not be exceeded, spit on page operation may be disabled for the print job. In this way, artefacts in the finished printed product due to spit on page operation may be reduced or avoided when not required.

Figure 4:
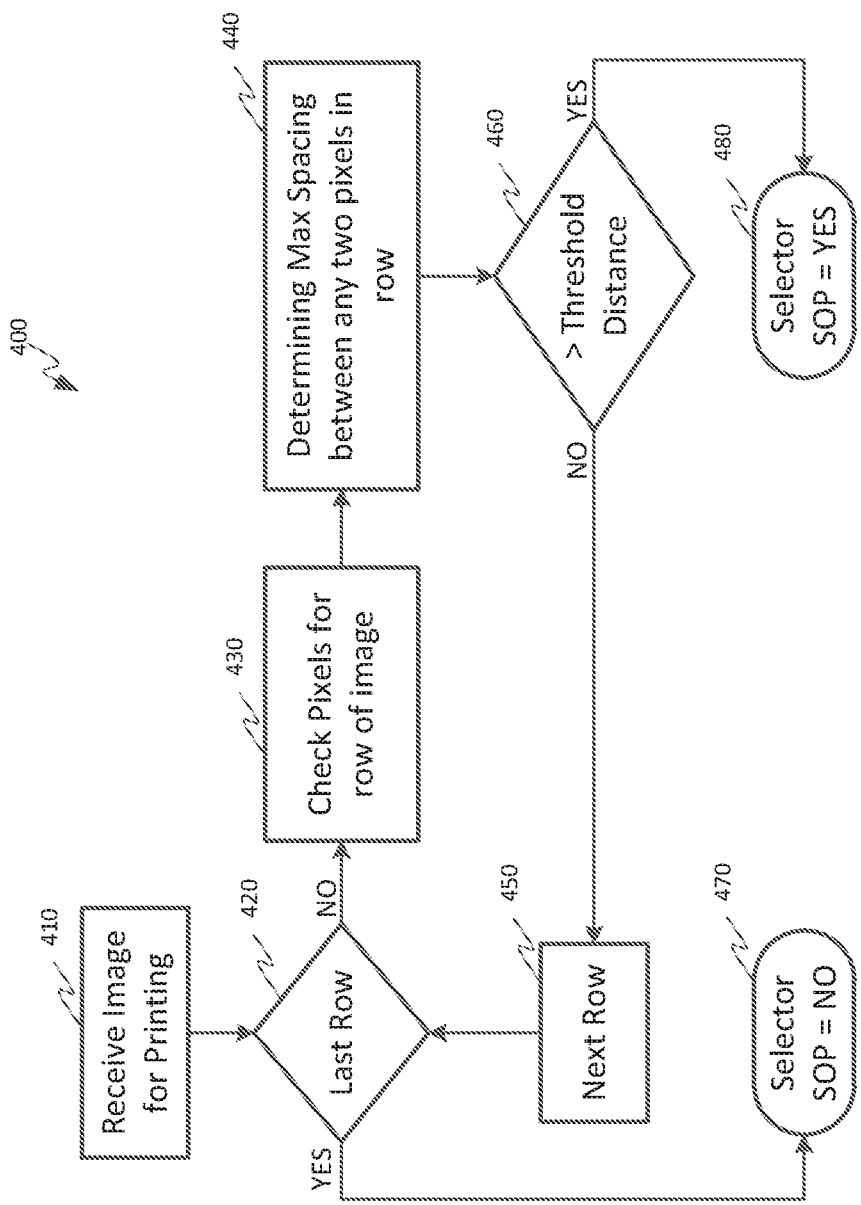
FIG. 4 shows a method according to an example of the disclosure.

FIG. 4 illustrates an example method 400 of analysing images to be printed to determine whether spit on page should be used. According to the method of FIG. 4, at least one image is received 410 for printing. Each row of the image is analysed individual to check 430 for pixels in that row. For identified pixels in the row, a maximum spacing between any two consecutive pixels is determined 440, and this maximum spacing is compared 460 against a threshold distance. If it is determined that the maximum spacing is greater than the threshold distance, a spit on page enable signal (SOP=YES) is enabled 480, and the method ends.

If the maximum spacing for that row is determined to be less than the threshold distance, the method moves on to the next row 450 and repeats the analysis for that row. If it is determined 420 that the last row of the image has been analysed without identifying a row with a spacing exceeding the threshold distance, the spit on page enable signal is disabled 470 (SOP=NO) and the method ends.

According to some examples, only certain qualifying pixels are considered when determining the maximum spacing for a row between two consecutive pixels. For example, pixels having an activation level less than a threshold level, e.g. level 20 of 255, may not cause sufficient ink to be ejected by a nozzle to avoid possible decap issues. Therefore, only pixels having an activation level greater than the threshold activation level may be considered qualifying pixels.

According to some examples, the method of FIG. 4 may be applied separately for each colour used in the image. For example, different colours may be associated with different nozzles of the printhead 140 and therefore decap times are monitored separately for each nozzle i.e. each row may be analysed to determine a maximum spacing between two consecutive qualifying pixels of each different colour.

Furthermore, it will be understood that different inks may have different properties resulting in different acceptable decap times. Thus, the threshold distance may be different for nozzles corresponding to different inks.

According to some examples, information relating to acceptable decap times or threshold distances may be provided for each ink by a driver software or firmware associated with the printing device. The threshold distance may be determined from the decap time based on a speed of operation of the printing device. For example, for an acceptable decap time of 1 s in at 60 ips (inches per second) the threshold distance would be determined to be 60 inches (152 cm).

According to some examples, by taking into account the limitations of the human visual system, it may be possible to further reduce the number of print operations for which spit on page is enabled. In particular, it has been determined that the human eye may not be able to see the spread effect caused by activation of a single nozzle on one row that has exceeded its decap time. However, the cumulative effect of spreading from multiple rows of nozzles is visible and would result in undesirable artefacts in the print on the print medium. Taking this limitation of the human eye into account, some examples do not activate spit on page unless a threshold spacing is exceeded on a plurality of consecutive rows.

Returning to FIG. 3*a*, rows 302*a* to 302*e* of the illustrated example comprise a spacing 304 greater than the threshold spacing, however, row 302*f* has a smaller spacing 306 between qualifying pixels that may be less than the threshold distance. According to the example method of FIG. 4, this would result in spit on page being enabled. However, in some examples, spit on page may only be enabled if a number of consecutive rows greater than a threshold number, e.g. 8, and thus even though rows 302*a* to 302*e* exceed the threshold distance, spit on page operation would still be disabled.

While this variation may result in some minor artefacts due to decap time of some nozzles being exceeded in some locations, the overall quality of the printed image may be improved by avoiding spit on page dots across the whole image.

Figure 5:
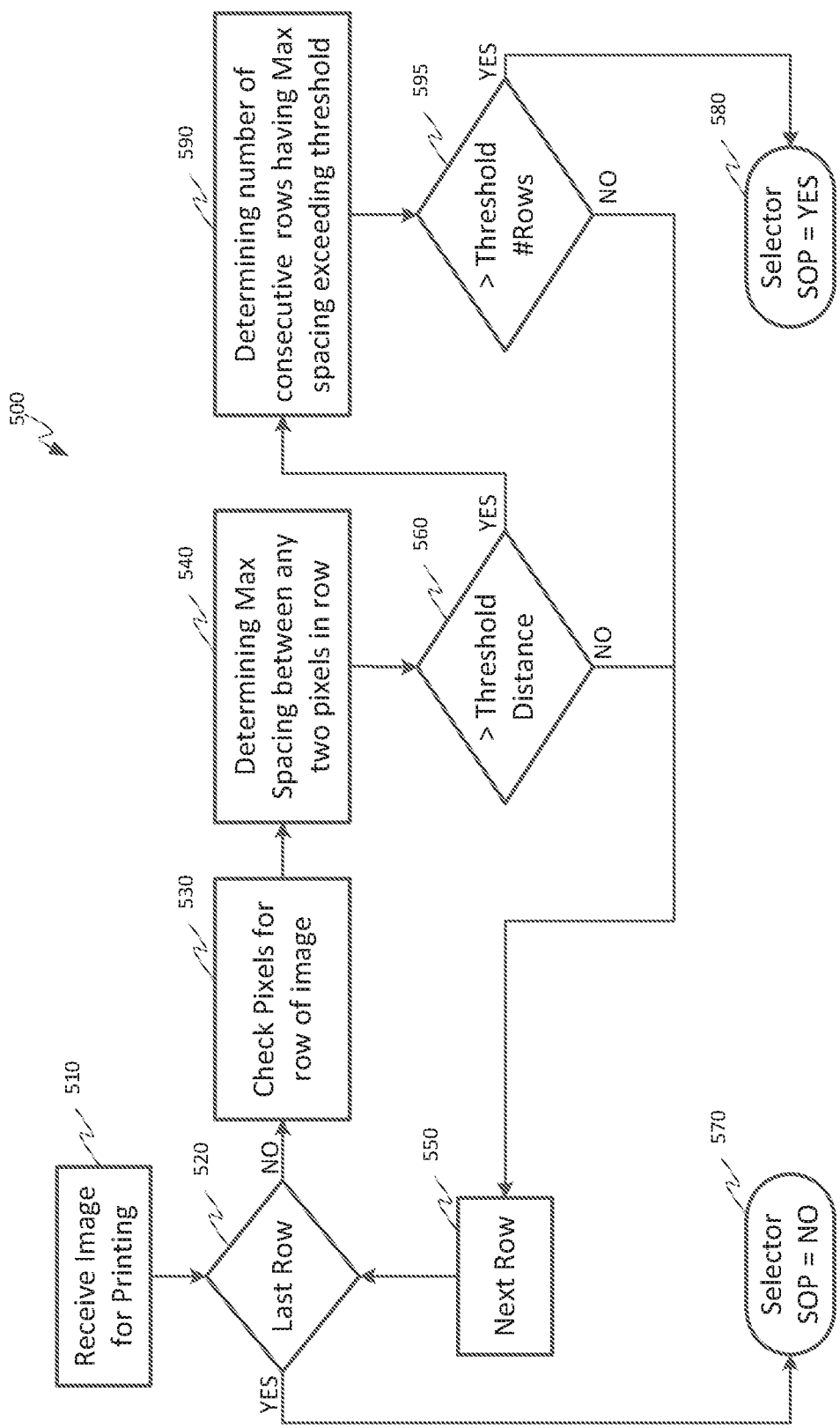
FIG. 5 shows another method according to an example of the disclosure.

FIG. 5 shows a method 500 according to an example of the disclosure that relies on multiple consecutive rows of the image exceeding a threshold spacing. According to the method 500 of FIG. 5, at least one image is received 510 for printing. Each row of the image is analysed individual to check 530 for pixels in that row. For identified pixels in the row, a maximum spacing between any two consecutive pixels is determined 540, and this maximum spacing is compared 560 against a threshold distance. If it is determined that the maximum spacing is less than the threshold distance, the method moves on to the next row 550 and repeats the analysis for the next row. If it is determined 520 that the last row of the image has been analysed, the spit on page enable signal is disabled 570 (SOP=NO) and the method ends.

In contrast to the method illustrated in FIG. 4, if it is determined that the maximum spacing between consecutive pixels exceeds the threshold distance, the number of consecutive rows having a maximum spacing exceeding the threshold is then determined 590. If it is determined 595 that the number of consecutive rows meeting this limitation exceeds a threshold number of rows, then the spit on page enable signal (SOP=YES) is enabled 580, and the method ends. If it is determined 595 that the threshold number of consecutive rows has not been exceeded then the method moves on to the next row 550 and repeats the analysis for the next row, as before.

As with the method 400 described above, according to some examples the method 500 may only consider qualifying pixels having an activation level greater than a certain amount. Furthermore, the method may be applied separately to each ink or nozzle on a row, i.e. requiring a particular nozzle to exceed its threshold distance for the threshold number of rows before providing an indication to enable spit on page operation.

Figure 6:
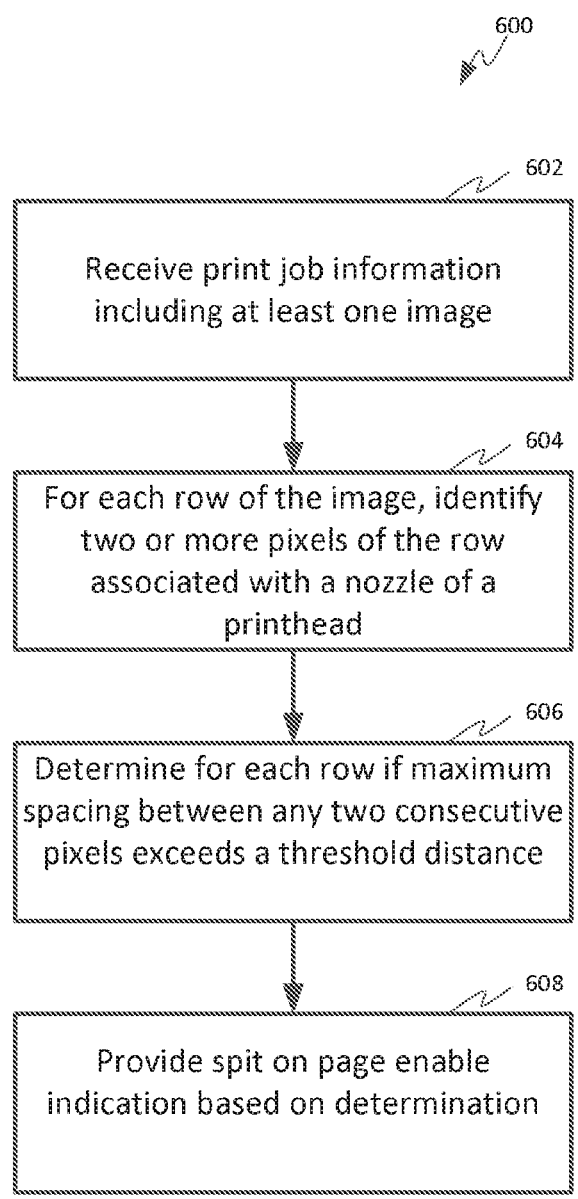
FIG. 6 shows another method according to an example of the disclosure.

FIG. 6 shows a method 600 according to an example of the disclosure. According to the method of FIG. 6, print job information including at least one image is received 602, for example via network module 150 by a image processor 132. The image processor 132 identifies 604, for each row of the image, two or more pixels of the row associated with a nozzle of the printhead 140. The image processor 132 then determines 606 whether a maximum spacing between any two consecutive pixels for the row exceeds a threshold distance. The image processor 132 then provides 608 a spit on page enable indication based on the determination 606.

The indication may then be provided to print file generator 134 to incorporate spit on page dots into the image to be printed dependent on the indication.

The skilled person would understand that the printhead or printhead nozzle "spitting" printing liquid could be referred to as the printhead or printhead nozzle "ejecting", "firing" or "depositing" printing liquid.

The skilled person would understand that while this disclosure has been described with reference to components of a typical 2D printing system, the disclosure could equally be applied to a 3D printing system or any other type of printing system provided implementing spit on page to avoid problems with decap of nozzles.

Figure 7:
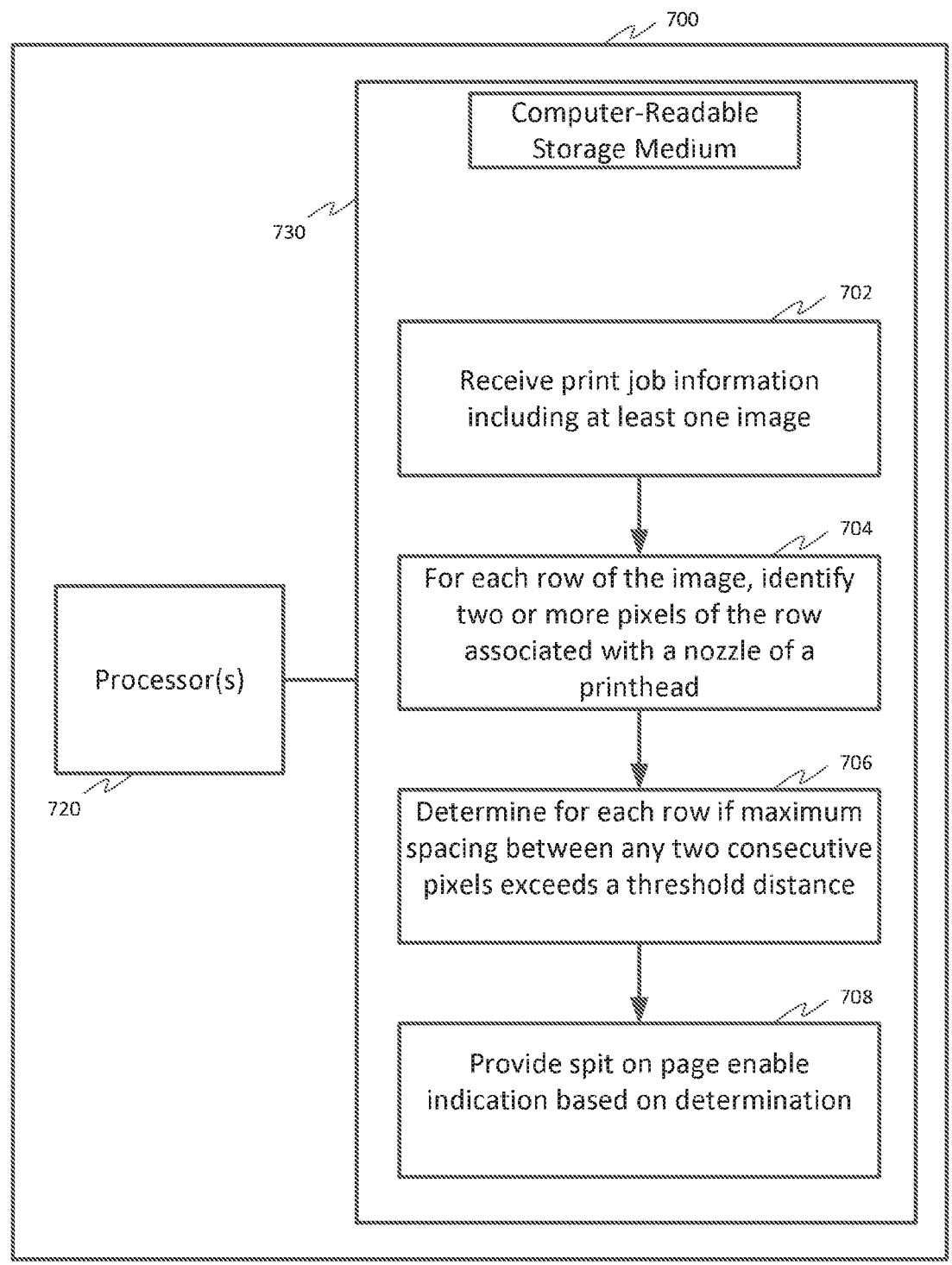
FIG. 7 is a schematic block diagram of a computer system according to an example of the disclosure.

Certain methods and systems as described herein may be implemented by one or more processors that processes program code that is retrieved from a non-transitory storage medium. FIG. 7 shows an example 700 of a device comprising a computer-readable storage medium 730 coupled to at least one processor 720. The computer-readable media 730 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In FIG. 7, the computer-readable storage medium comprises program code to: receive 702 print job information including at least one image, identify 704, for each row of the image, two or more pixels of the row associated with a nozzle of a printhead, determine 706 for each row if a maximum spacing between any two consecutive pixels exceeds a threshold distance, and provide 708 a spit on page indication based on the determination 706.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A method of controlling spit on page operation, the method comprising:
   receiving at least one image to be printed;
   for each row of a plurality of rows of the image:
   identifying two or more pixels of the row of the image to be printed by a nozzle of a printhead;
   determining if a spacing between two consecutive pixels of the two or more pixels is greater than a threshold distance; and
   in response to a determination that the spacing between the two consecutive pixels is greater than the threshold distance, providing an indication that spit on page dots should be provided when printing the image and providing no indication that spit on page dots should be provided if the spacing between the two consecutive pixels is less than the threshold distance, wherein the spit on page dots are to be provided in order to clean the nozzle of the printhead.

2. The method of claim 1 further comprising:
   in response to the indication that spit on page dots should be provided when printing the image,
   merging a first layer comprising the spit on page dots with a second layer comprising the at least one image to be printed to generate an output file.

3. The method of claim 2, further comprising providing the output file to a printing apparatus to be printed to a print medium.

4. The method of claim 1, wherein identifying two or more pixels of the row of the image to be printed by the nozzle of the printhead further comprises identifying two or more qualifying pixels having an output level greater than a threshold level; and wherein determining a spacing between two consecutive pixels comprises determining a spacing between two consecutive qualifying pixels.

5. The method of claim 1, wherein the threshold distance comprises a distance travelled by the nozzle over a print medium in a predefined decap time of the nozzle when printing to the print medium.

6. The method of claim 1, further comprising:
   determining a number of consecutive rows of the image, each row of the consecutive rows having a spacing between two consecutive pixels greater than the threshold distance; and wherein providing the indication that spit on page dots should be provided is further in response to the determined number of consecutive rows being greater than a threshold number of rows.

7. The method of claim 1, wherein each row of the image is to be printed by a plurality of nozzles of the printhead, each nozzle associated with a different ink; and
   wherein the method further comprises for each nozzle of the plurality of nozzles:
   identifying two or more pixels of the row of the image to be printed by the nozzle of the plurality of nozzles;
   determining if a spacing between two consecutive pixels of the two or more pixels is greater than a threshold distance; and
   in response to a determination that the spacing between the two consecutive pixels is greater than the threshold distance, providing an indication that spit on page dots for the nozzle of the plurality of nozzles should be providing when printing the image.

8. The method of claim 1, further comprising
   obtaining an indication that spit on page should be used and the threshold distance from a firmware associated with an output printing apparatus.

9. A computer program product comprising computer program code that when executed on a process implements the method of claim 1.

10. The method of claim 1, wherein the threshold distance is set based on a predetermined type of ink.

11. The method of claim 1, wherein the threshold distance is set based on a speed of operation of a printing device including the printhead.

12. The method of claim 1, wherein the threshold distance is set based on human eye limitations.

13. An image processing device comprising:
    a receiver to receive an image to be printed; and
    an image processor to:

identify two or more pixels of the row of the image to be printed by a nozzle of a printhead;

determine if a spacing between two consecutive pixels of the two or more pixels is greater than a threshold distance; and in response to a determination that the spacing between the two consecutive pixels is greater than the threshold distance, provide an indication that spit on page dots should be provided when printing the image and provide no indication that spit on page dots should be provided when the spacing between the two consecutive pixels is less than the threshold distance, wherein the spit on page dots are to be provided in order to clean the nozzle of the printhead.

14. The image processing device of claim 13, wherein the image processor is further to:

identify the two or more pixels of the row of the image by identifying two or more qualifying pixels having an output level greater than a threshold level; and determine the spacing between two consecutive pixels by determining a spacing between two consecutive qualifying pixels.

15. The image processing device of claim 13, wherein the threshold distance comprises a distance travelled by the nozzle over a print medium in a predefined decap time of the nozzle when printing to the print medium.

16. The image processing device of claim 13, wherein the image processor is further to:

identify two or more pixels of the row of the image to be printed by a nozzle of a plurality of nozzles;

determine if a spacing between two consecutive pixels of the two or more pixels is greater than a threshold distance; and in response to a determination that the spacing between the two consecutive pixels is greater than the threshold distance, provide an indication that spit on page dots for the nozzle of the plurality of nozzles should be provided when printing the image.

17. The image processing device of claim 13, wherein the image processor is further to:

determine a number of consecutive rows of the image each having a spacing between two consecutive pixels greater than the threshold distance; and provide the indication that spit on page dots should be provided when printing the image.

18. A printing apparatus comprising the device of claim 13 and further comprising:

a raster image processor to provide the image to the image processing device;

an output processor to receive the indication that spit on page dots should be provided and insert the spit on page dots into an output file by merging a first layer comprising spit on page dots with a second layer comprising the image to be printed; and a print engine to print the output file to a print medium.

* * * * *